United States Patent Office 2,928,861
Patented Mar. 15, 1960

2,928,861

β-HALOALKANEPHOSPHONATES

James N. Short, Borger, Tex., assignor to Phillips Petroleum Company, a corporation of Delaware No Drawing. Application April 22, 1954
Serial No. 425,020

2 Claims. (Cl. 260—461)

This invention relates to β-haloalkanephosphonates. In one aspect this invention relates to certain β-haloalkanesphosphonates as new compounds. In another aspect this invention relates to preparing novel β-haloalkanephosphonates by reacting a tri-substituted organic phosphite with an alkyl dihalide. In still another aspect this invention relates to polymeric organic compounds formed by reacting a conjugated diene-heterocyclic base copolymer with a β-haloalkanephosphonate.

According to the invention there is provided, as a new compound, a bis-substituted-β-haloalkanephosphonate which can be represented by the structural formula

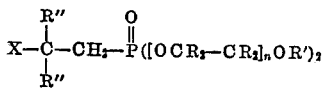

wherein $n$ is an integer from 1 to 6, X is a member of the group consisting of chlorine, bromine, and iodine, R is either a hydrogen or methyl radical, R' is a member of the group consisting of alkyl, aryl, aralkyl, alkaryl and cycloalkyl radicals, R'' is either a hydrogen or an alkyl radical containing from 1 to 10 carbon atoms, where the group represented by R are the same or different, where the groups represented by R'' are the same or different, where the number of carbon atoms in R' ranges from 1 to 10, and where the total number of carbon atoms in the compound does not exceed 30.

Further according to the invention there is provided a method of preparation for the novel bis-substituted-β-haloalkanephosphonates.

Included in the group of compounds represented by the above formula are bis(2-methoxyethyl)-2-bromoethanephosphonate,
bis(2-[2-benzyloxyethoxy]-ethyl) - 2 - iodopropanephosphonate,
bis[2-(1-phenoxypropyl)]-2-iodopropane-1-phosphonate,
bis(2-cyclohexyloxyethyl)-2-chloroethanephosphonate,
bis(2-o-toloxyethyl)-2-iodoethanephosphonate,
bis[2-(3-butoxybutyl)]-2-bromo - 2,3 - dimethylbutane-1-phosphonate,
bis[2 - (tert-butylphenoxy)ethyl] - 2 - bromohexanephosphonate,
bis(2-decyloxyethyl)-2-iodoisobutyl-1-phosphonate, and phosphonic acid esters of polyether glycols such as

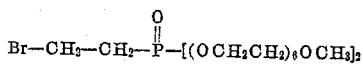

and

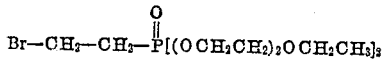

A preferred method for the preparation of the above described compounds is to react an organic halide with an organic tertiary phosphite to form a phosphonate. It is presently believed that a phosphonium compound forms as an intermediate and that the reaction proceeds according to the following equations:

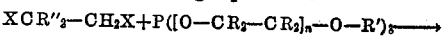
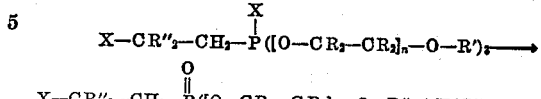

The preferred method of operation is to heat the phosphite with the organic halide in amounts ranging from a slight molar excess of organic halide up to a mol ratio of halide to phosphite of 10:1. The high molar ratio tends to prevent the phosphite from reacting with the second halogen atom of the organic dihalide and with the halogen-substituted ether which is one of the products of the reaction. When the halogen-substituted ether boils at a temperature lower than any of the reactants, it is advantageous to carry out the reaction at a temperature at which a steady reflux is obtained, while distilling off the halogen-containing byproduct as formed. Otherwise it can remain in the reaction mixture, and the product separated from it and other impurities by any suitable means, as by extraction, crystallization, or fractional distillation.

The alkyl dihalides suitable for use in preparing the compounds of my invention can be represented by the formula:

where R'' and X are defined as above. I prefer to use primary symmetrical halides. Suitable alkyl dihalides are ethylene bromide, 1,2-diiodopropane, ethylene chloride, ethylene iodide, 1,2-dibromo-2,3-dimethylbutane, and the like.

The phosphites which I prefer to use to prepare the compounds of my invention can be represented by the formula

where $n$, R, and R' are as heretofore defined. I prefer to use materials where R is a hydrogen radical and $n$ is 1 or 2, such as, for example, in tris(2-methoxyethyl) phosphite. Other suitable phosphites are tris[2-(3-butoxybutyl)] phosphite,
tris(2-[2-benzyloxyethoxy]ethyl) phosphite,
tris[2-(1-phenoxypropyl)] phosphite,
tris(2-cyclohexyloxyethyl) phosphite,
tris(2-o-toloxyethyl) phosphite, triesters of phosphorous acid with polyether alcohols, such as $P([OCH_2CH_2]_6OCH_3)_3$ and

and the like.

These phosphites can be prepared by any suitable means. One method is to react at low temperatures one mol of phosphorus trichloride with three mols of a monohydroxy mono- or polyether in the presence of 3 mols of an amine and in the presence of sufficient ether to cause substantially complete precipitation of the amine hydrochloride that is formed. Materials known commercially as Cellosolves and Carbitols provide suitable hydroxy ethers.

The following examples are illustrative of the invention.

*Example 1*

A solution of 160 g. (0.6 mol) of tris(2-methoxyethyl) phosphite in 558 g. (3.0 mols) of ethylene bromide was heated in a reactor fitted with a fractionating column. The β-bromoethyl methyl ether was removed as formed as an overhead product distilling at 110 to 125° C. at a reflux ratio of 5:1, while the remainder of the reaction mixture was refluxed. After 95 g. of material had distilled over, refluxing was stopped, and unreacted ethylene bromide was removed by fractionation under reduced pressure. The residue was distilled to yield 65 g. of a fraction boiling at 116–126° C. at 0.1 mm. Hg. It was identified as bis(2-methoxyethyl) 2-bromoethanephosphonate. The refractive index was $n_D^{25}$ 1.4600, the density at 25° C. was 1.324, and the molecular refractivity was: observed, 61.1; calculated 63.2.

*Analysis.*—Calculated for

Br, 26.2%. Found: 24.9%.

Example 2

To a cooled solution of 228 g. (3 mols) of 2-methoxyethanol in 447 g. (3 mols) of diethylaniline and 500 cc. of ethyl ether was added, with stirring, 144 g. (1.05 mols) of $PCl_3$ at such a rate that the temperature remained at 10–15° C. An additional 500 cc. of ether was then added, and the diethyl-aniline hydrochloride was filtered off and washed three times by suspension in 500 cc. of ether followed by filtration. From the combined filtrate and washings was obtained 200 g. of tris(2-methoxyethyl) phosphite by fractional distillation under reduced pressure. Its refractive index was $n_D^{25}$ 1.4401, compared with a literature value of $n_D^{20}$ 1.4402.

As an added feature of my invention it has been found that the phosphonates of the invention can be reacted with a conjugated diene-heterocyclic nitrogen base copolymer to produce a solid polymeric material. The phosphonates of the invention serve as quaternizing agents for the tertiary amino nitrogen in the said copolymer. The solid polymeric material, after quaternization, is an oil-resistant, rubber-like material which also possesses desirable low temperature properties. When compounded and cured it has greatly improved oil resistance over the unquaternized copolymer, as evidenced by swelling tests in hydrocarbon solvents. The oil-resistant rubbery polymer products of the invention are particularly valuable and useful as rubber substitutes and are especially valuable in the manufacture of gaskets and similar articles which in use come into contact with hydrocarbons, solvents, etc.

Example III below illustrates the above-described added feature of my invention.

Example 3

A 70 percent conversion, 85/15 butadiene/2-methyl-5-vinylpyridine copolymer prepared by emulsion polymerization at 41° F. and having a Mooney value of 81 was compounded on a roll mill in accordance with the recipe given below.

|  | Parts by Weight | |
| --- | --- | --- |
|  | Formula A | Formula B |
| Butadiene/2-methyl-5-vinylpyridine copolymer | 100 | 72.5 |
| Bis(2-methoxyethyl) 2-bromoethanephosphonate |  | 27.5 |
| Philblack A | 60 | 60 |
| Zinc Oxide | 5 | 5 |
| Sulfur | 1.5 | 1.5 |
| Altax [1] | 1.5 | 1.5 |
| Stearic Acid | 1.5 | 1.5 |
| TP 90-B [2] | 10 | 10 |

[1] Benzothiazyl disulfide.
[2] Dibutyl carbitol formal.

The compounded samples were cured 45 minutes at 307° F. and physical properties determined. Tests for swelling and extractability were made by immersing weighed samples in a mixture containing 70 percent isooctane and 30 percent toluene at 158° F. for 48 hours. The volume percent swell was determined by noting the volume of a test specimen before and after immersion in the liquid hydrocarbon mixture. Extractability was determined by drying the sample at 158° F. for 48 hours and weighing it. From the difference in weight before and after immersion in the liquid hydrocarbon mixture, the extractability was calculated. Low temperature properties were determined by the temperature retraction test. In this operation a test specimen of certain dimensions is elongated 50 percent, placed in a Dry Ice-acetone bath at −72° C. for 3 minutes, and then released. The bath is allowed to warm slowly and the temperature at which the samples retract certain predetermined lengths are recorded as T-R values. Results of the various tests on the different samples are shown in the following table:

|  | Tensile Strength, p.s.i. | Elongation, Percent | Swell, Percent | Extractability, Percent | T-R, $T_3$[a] |
| --- | --- | --- | --- | --- | --- |
| Formula A | 1,790 | 275 | 140 | .6 | −63 |
| Formula B | 1,560 | 210 | 89 | 15 | −65 |

[a] 3 percent retraction.

As is shown by this table, swelling properties are much improved while the product still has good low-temperature qualities.

When carrying out the mill-mixing procedure as above, the quaternizing agent is added first and then the compounding ingredients. The admixture, after compounding, is quaternized and cured simultaneously. It is desirable to adjust the mixture composition and temperature, depending upon the properties desired in the final product, so that the time required for quaternization and curing are about the same. In some instances where the quaternizing reaction requires more time than is needed for curing, the quaternization reaction is preferably effected first. In such instances the quaternized copolymer is then mixed and compounded with the compounding ingredients.

If desired, more or less than the stoichiometric amount of quaternizing agent can be employed depending upon the physical properties desired in the solid polymeric material product. For example, only about 20 to 50 percent of the required stoichiometric amount can be used or 10 percent stoichiometric excess over the amount theoretically required can be used.

As mentioned, the quaternization reaction can be carried out first to effect the formation of a solid polymeric material which is then compounded and cured. When this procedure is employed, the quaternization reaction is usually carried out by heating portions of the copolymer with the desired quantity of the phosphonate at a temperature within the range of 0° to 250° C., although higher or lower temperatures can be used if desired. The time required to substantially completely effect reaction is dependent upon the temperature employed and usually varies from a few minutes, about 5 to 10 minutes, to about 10 hours or more.

In some instances it is advantageous to mix the quaternizing agent into the polymer at a low temperature at which little or no quaternizing reaction will occur and also to add compounding ingredients at least prior to completion of the heating, preferably before any heating is effected. The foregoing low temperature admixture is highly desirable especially when quaternization of a polymer results in a mass into which it is somewhat difficult to incorporate desired compounding ingredients after substantial heating or quaternization has taken place.

The copolymers from which these solid polymers are prepared can be produced by any suitable method, e.g., emulsion polymerization. These copolymers, if liquid, can vary from very fluid to very viscous materials and can have a viscosity measurement in SUS at 100° F. from below about 1000 up to about 10,000 or higher, such as 400,000. If solids, these copolymers may range from soft to rather hard rubbers, preferably having a ML-4 Mooney value in the range 10 to 100 and higher.

The conjugated dienes employed in the production of the copolymers employed in the practice of this invention are preferably those conjugated dienes which contain four to six, inclusive, carbon atoms per molecule and include 1,3-butadiene, isoprene, piperylene, methylpentadiene, 2,3-dimethyl-1,3-butadiene, chloroprene and others. However, conjugated diolefins having more than 6, such as 8, carbon atoms per molecule may also be used. Furthermore, various alkoxy, such as methoxy and ethoxy, and cyano derivatives of these conjugated diolefins can also be used in the process of my invention.

The heterocyclic nitrogen bases, including the alkyl substituted bases, which are applicable in the practice of my invention are those which are copolymerizable with a conjugated diene and include the

substituted nitrogen bases wherein R is a hydrogen or a hydrocarbyl (containing only carbon and hydrogen atoms) group such as an alkyl group. The vinyl-substituted heterocyclic nitrogen bases of the pyridine and quinoline series having only one vinyl substituent group as well as their various alkyl substituted derivatives are preferred. The total number of carbon atoms in the nuclear substituted alkyl groups attached to any pyridine or quinoline derivative preferably should be not greater than 12. In addition to vinyl-substituted pyridines and vinyl-substituted quinolines, the isopropenyl substituted (i.e. a vinyl group having a methyl substituent in the alpha position) pyridines and quinolines are useful. Examples are 2-methyl-5-vinylpyridine, 2,5-divinylpyridine, 2,3,4-trimethyl-5-vinylpyridine, 3-ethyl-5-vinylpyridine, 2-vinylpyridine, 2-vinylquinoline, etc.

It will be noted that the halogen in the compounds of the invention is attached in beta position. This is believed to be a great advantage because it appears that in this position the halogen is activated by the phosphorus and its substituents, thus increasing the effectiveness of the compounds in the quaternization reaction described herein.

The phosphonates of this invention are also useful as lubricating oil additives, flameproofing agents for textiles, as additives for elastomers and the like.

Reasonable variation and modification are possible within the scope of the foregoing disclosure and the appended claims to the invention the essence of which is: that new compounds comprising bis-substituted-β-haloalkanephosphonates characterized by the above given structural formula and a method of preparation therefor have been provided; and that new solid polymeric materials comprising the reaction product of a new bis(alkoxyalkyl)β-haloalkanephosphonate with a conjugated diene-heterocyclic nitrogen base copolymer have also been provided.

I claim:

1. A β-haloalkanephosphonate characterized by the structural formula

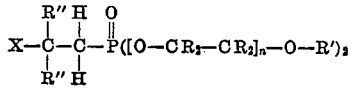

wherein:

$n$ is an integer from 1 to 6;

X is a member selected from the group consisting of chlorine, bromine and iodine;

each R is a member selected from the group consisting of hydrogen and a methyl radical;

R' is a member selected from the group consisting of alkyl, aryl, aralkyl, alkaryl and cycloalkyl radicals;

each R" is a member selected from the group consisting of hydrogen and an alkyl radical containing from 1 to 10 carbon atoms;

the number of carbon atoms in each of the R' members ranges from 1 to 10; and the total number of carbon atoms in the compound does not exceed 30.

2. Bis(2-methoxyethyl) 2-bromoethanephosphonate.

References Cited in the file of this patent

UNITED STATES PATENTS

| | | |
|---|---|---|
| 2,380,356 | Youker | July 10, 1945 |
| 2,389,576 | Kosolapoff | Mar. 20, 1945 |
| 2,400,577 | Toy | May 21, 1946 |
| 2,436,141 | Goebel | Feb. 17, 1948 |
| 2,587,340 | Lewis et al. | Feb. 26, 1952 |
| 2,599,761 | Harman et al. | June 10, 1952 |
| 2,604,668 | Miller et al. | July 29, 1952 |
| 2,708,204 | Bell et al. | May 10, 1955 |